UNITED STATES PATENT OFFICE.

WILLIAM E. ARMSTRONG, OF NEW YORK, N. Y.

IMPROVEMENT IN MEDICATED LICORICE.

Specification forming part of Letters Patent No. 221,014, dated October 28, 1879; application filed September 8, 1879.

*To all whom it may concern:*

Be it known that I, WILLIAM E. ARMSTRONG, of New York city, have invented a new and Improved Medicated Licorice Compound, of which the following is a specification.

My invention aims to furnish an efficacious yet pleasant compound of licorice-root and tar for coughs, colds, &c., to be used by slowly chewing or masticating a quid of the medicated root in the mouth.

In preparing this compound I grind the licorice-root into coarse short fibers sufficiently fine to be capable of quick and thorough saturation, and yet of a sufficient size to be adapted to cohere into a compact quid when placed in the mouth. This ground root is then saturated with a tarry liquid compounded as follows: oil of tar, two ounces; glycerine, one ounce; simple sugar sirup, one ounce; alcohol, one pint.

When the ground root is sufficiently saturated with this liquid, so as to be well moistened throughout, yet not absolutely wet, it is then packed in tin or other moisture-tight packages for the use of the consumer.

When a quid of this tar licorice is placed in the mouth and slowly masticated or allowed to become quietly saturated, the healing effects of the tar are conveyed mainly by inhalation to the lungs and throat; and as the tarry matter is suspended in a saccharine and glyceric liquid, which intimately combines therewith, it becomes diffused over the surfaces of the mouth in a very thin film, which causes the breath in entering the lungs to be well charged with the healing aroma of the tar. At the same time the presence of the glycerine and sugar with the tarry matter imparts palatable and soothing qualities to the compound, preventing the tar becoming irritant or offensive on the surfaces of the mouth, and, together with the juices of the licorice, cause the tarry matter to perfectly assimilate with the liquids of the mouth and stomach, thus obtaining the greatest medical effect from the tar and licorice, and at the same time rendering the compound pleasant to the senses.

I sometimes prefer to grind a small proportion of elm-bark with the licorice-root, the mucilaginous character of this ingredient conducing to the perfect assimilation of the other ingredients and rendering the compound mild; but this is optional, as some persons prefer the compound without this ingredient, and others with it, so that where a strong effect is desired I dispense with this ingredient, and where a milder effect is looked for I introduce it.

I lay no claim to saccharated and pulverulent tar; but

What I claim as my invention is—

The medicated licorice compound herein described, consisting of ground licorice saturated with a mixture of tar, glycerine, sugar, and alcohol, substantially as herein set forth.

W. E. ARMSTRONG.

Witnesses:
 EDWARD H. WALES,
 CHAS. M. HIGGINS.